3,336,105
PREPARATION OF SODA ASH
William F. Beck, Princeton Junction, and Patrick M. Di Bello, Matawan, N.J., assignors to FMC Corporation, New York, N.Y., a corporation of Delaware
Filed Mar. 1, 1965, Ser. No. 436,138
6 Claims. (Cl. 23—63)

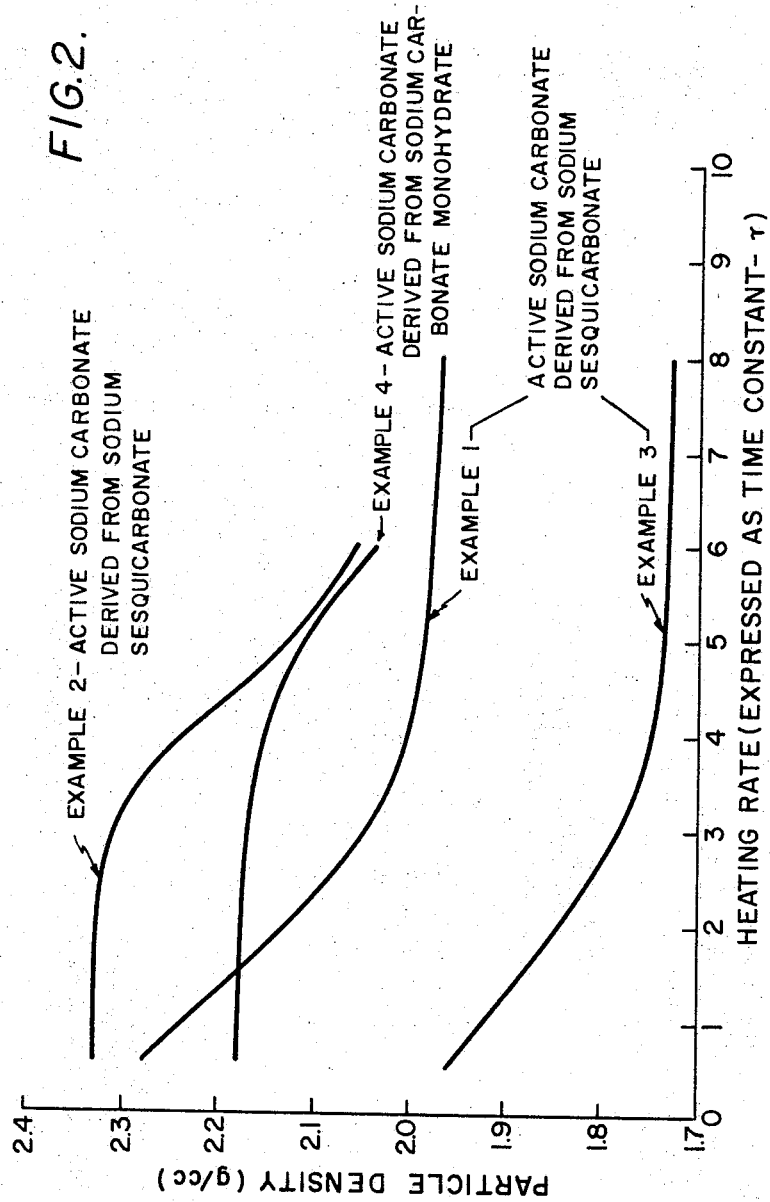

This application is a continuation-in-part of Ser. No. 420,601, filed Dec. 23, 1964, in the names of Alan B. Gancy and Patrick M. Di Bello.

This invention relates to a process for producing dense soda ash and more particularly to an improved process for sintering an activated sodium carbonate to obtain a highly dense soda ash.

Commercial sodium carbonate is produced by a number of different methods including the classical Solvay or ammonia-soda process, the sodium carbonate monohydrate process and the sodium sesquicarbonate process. In the Solvay process an ammoniated, aqueous brine is reacted with carbon dioxide to produce sodium bicarbonate crystals which are subsequently calcined to sodium carbonate; if desired, the product is hydrated to sodium carbonate monohydrate and calcined to a more dense soda ash.

In the sodium carbonate monohydrate process sodium carbonate monohydrate crystals are precipitated from a clarified, filtered aqueous solution of calcined trona and subsequently calcined to soda ash as described in U.S. Patent 2,962,348 issued to Seglin et al., Nov. 29, 1960.

In the sodium sesquicarbonate process monoclinic sodium sesquicarbonate crystals are precipitated from a filtered, purified solution of trona and calcined to soda ash as described in U.S. Patent 3,028,215 issued to W. R. Frint on Apr. 3, 1962.

One difficulty with the soda ash produced by the above processes is the low bulk densities of the resultant product, i.e. bulk densities no higher than about 60 lbs./cu. ft. A method for increasing the bulk density of soda derived from precursor crystals such as sodium carbonate monohydrate or sodium sesquicarbonate is set forth in our parent patent application Ser. No. 420,601, filed Dec. 23, 1964 in the names of Alan B. Gancy and Patrick M. Di Bella of which this application is a continuation-in-part.

In the above process a precursor crystal, e.g. sodium sesquicarbonate, is calcined under critical conditions of temperature and water vapor pressure to produce an "active" sodium carbonate product. This product has smaller sized pores, higher surface area and smaller crystallite size than conventional soda ash and it is considered "active" because it is more susceptible to densification on heat sintering than conventional soda ash produced by ordinary calcination of the precursor crystal. The "active" soda ash is then densified by merely heat sintering it to temperatures of from about 300° C. to about 800° C. so that each particle is converted into a more imporous, coherent mass without melting.

It is an object of the present invention to densify an "active" sodium carbonate product to higher densities by means of a new and controlled sintering process.

This and other objects will be apparent from the following description.

We have found unexpectedly that "active" sodium carbonate can be densified in a heat sintering step at temperatures of from about 350° C. to about 600° C. to much higher densities by carrying out the heating step at an extremely high heating rate during the intitial portion of the heating step until the "active" sodium carbonate reaches the desired sintering temperature, said heating rate being sufficient to yield a time constant, $\tau$, of less than four minutes when the heating step is expressed by the formula:

$$T_t - T_\theta = (T_t - T_0)e^{-\theta/\tau}$$

wherein:

$T_t$ = final temperature
$T_0$ = initial temperature
$T_\theta$ = temperature at the end of any period of time $\theta$
$\theta$ = the elapsed time (in min.) since the beginning of the heating period
$\tau$ = time constant (in min.)

In the above formula a time constant, $\tau$, of four minutes means that the temperature of the "active" soda ash has increased about 63% of the total heating range after heating for four minutes, and increased about 95% of the total heating range after heating for about twelve minutes.

The term "active" sodium carbonate as used herein refers to the product obtained by calcining a precursor crystal, which is convertible on heating to sodium carbonate, within critical temperatures ranges and in an atmosphere having reduced water vapor pressures. For example, sodium sesquicarbonate and sodium carbonate monohydrate can be converted to a highly "active" sodium carbonate when heated at temperatures up to about 135° C. in an atmosphere having reduced water vapor pressures. "Active" sodium carbonate is useful as a soda ash product per se in glass making and chemical reactions because of the smaller sized pores, higher surface area and smaller crystallite size of this product compared with conventionally produced sodium carbonate. It is "active" because it is more susceptible to densification on normal heat sintering than soda ash produced by conventional calcining of precursor crystals, e.g. sodium sesquicarbonate.

The mechanism by which this improved sintering technique yields soda ash of higher density is not known. While sintering as set forth in our parent application increases soda ash densities, we have found that the faster the active soda ash is heated to sintering temperatures, the greater the densification. Thus, at any given sintering temperature, greater densities are obtained by means of the present invention at shorter total sintering times with concomitant savings in heating costs. Further, merely sintering the active sodium carbonate for extended times beyond normal sintering periods, at any given sintering temperature, will not yield these high densities.

In carrying out the present invention, precursor crystals which have been precipitated from a concentrated aqueous solution containing sodium carbonate values alone or admixed with sodium bicarbonate values, are converted initially to "active" sodium carbonate by thermally treating them in an atmosphere containing low water vapor pressures. Thereafter, the "active" sodium carbonate is sintered at temperatures of from about 350° C. to about 600° C. in accordance with the present invention to obtain maximum density.

The thermal treatment necessary to convert the precursor crystals to "active" sodium carbonate consists of heating the precursor crystals within critical temperature ranges and in an atmosphere having low ambient water vapor pressures until conversion of the precursor crystal to sodium carbonate is substantially complete. With certain precursor crystals such as sodium sesquicarbonate and sodium carbonate monohydrate best results are obtained at temperatures of about 75° to 15° and at water vapor pressures below about 80 mm. of mercury. During this conversion water, or water and carbon dioxide, is liberated, depending upon the specific precursor crystal which is being converted to sodium carbonate.

As set forth in our parent application Ser. No. 420,601, the above conversion must be carried out under conditions which will remove the decomposition gases evolved during the reaction at a rate sufficient to reduce the ambient water vapor pressure of the crystals to the extent required for activation. When carbon dioxide ($CO_2$ is given off during the conversion, the $CO_2$ partial pressure is reduced along with the $H_2O$ partial pressure. The final limit on water vapor pressure which will permit activation will depend on the specific precursor crystal being converted, on the temperature employed in producing the "active" sodium carbonate, and on the desired final density of the sintered product. The preferred technique for conversion of the precursor crystal to "active" sodium carbonate and for removing the evolved gases is to utilize a fluid bed. The resulting "active" sodium carbonate has smaller sized pores, higher surface area and smaller crystallite size than conventional soda ash as is described and illustrated in our parent application Ser. No. 420,601.

In accordance with the present invention, any "active" sodium carbonate, regardless of its precursor crystal or degree of activation, is then treated in our improved sintering step by heating this product at a temperature of from about 350° C. to about 600° C. This sintering operation must be conducted so that the heating rate is sufficiently high during the initial portion of the heating step to yield a time constant, $\tau$, of less than four minutes when the heating step is expressed by the formula:

$$T_f - T_\theta = (T_f - T_0)e^{-\theta/\tau}$$

wherein:

$T_f$ = final temperature
$T_0$ = initial temperature
$T_\theta$ = temperature at the end of any period of time $\theta$
$\theta$ = the elapsed time (in min.) since the beginning of the heating period
$\tau$ = time constant (in min.).

The time constant, $\tau$, in the above formula is a measure of the rate of temperature rise of the sample from the initial temperature of the sample, $T_0$, to the final sintering temperature of the sample $T_f$, at any time, $\theta$, during the heating step. Lower values of $\tau$ result in increased heating rates. When the heating is conducted so that the time constant is less than four minutes, a maximum increase in the density of the sintered soda ash product is obtained. Further, the sintering operation should be carried out in the presence of an atmosphere, low in moisture content for best results.

The equipment useful in carrying out this improved sintering process can be a simple furnace, a cocurrent heated rotary kiln or a fluid bed reactor, provided it has sufficient heat capacity to yield the desired heating rate. In the case of an internally heated kiln, the hot gases and the feed should be introduced into the same end of the kiln, in cocurrent fashion, to obtain the initially high heating rates required in the present process. In terms of heating efficiency at any given sintering temperature, countercurrent heating is more efficient, but cocurrent heating permits higher heating rates, and consequently produces higher densities in shorter sintering periods.

In the present sintering operation the feed to the sintering zone is substantially all soda ash that has been rendered active in a preceding thermal treating step. Accordingly, the sintering operation is intended merely to densify the soda ash to the maximum extent by heating each particle into a more imporous, coherent mass without melting.

The final density of the sintered product will depend upon the final temperature of sintering which is chosen within the range of 350° to 600° C. In general, higher sintering temperatures result in higher densities; however, when sintering is carried out at any one temperature within the above range, substantially higher densities are obtained at that sintering temperature by using the present increased heating rates. Moreover, increasing the time of sintering at any given sintering temperature, after initial sintering has occurred, does not materially increase the density of the finally sintered product.

In order to determine the extent of densification, the finally sintered product, and the charge of active sodium carbonate are tested for their particle densities. This is carried out by weighing a given charge of sodium carbonate into a picnometer of given volume, subjecting the contents of the picnometer to a vacuum of about 50 microns or less, placing the picnometer in a well of mercury and allowing the mercury to fill the picnometer to mark at atmospheric pressure. The particle density of the sample can then be calculated since the weight of charge is known and the volume of mercury displaced by the charge (volume of charge) can readily be determined. Particle densities for normal commercial soda ash have a value of about 1.6 g./cc. corresponding to a bulk density of about 52 lbs./cu. ft. "Active" sodium carbonate that has been sintered at about 400° C. in accordance with the present process has a particle density as high as 2.3 g./cc., corresponding to a bulk density of about 75 lbs./cu. ft. The total increase in density obtained in the present process depends on the extent of activation of the sample and the final sintering temperature used, as well as the rate of heating.

This invention will now be illustrated by reference to the following drawings. In the drawings:

FIG. 2 is a series of curves which illustrate the change in the final densities of various samples of "active" sodium carbonate obtained at sintering temperatures of 400° C. but at different heating rates.

Figure 1:
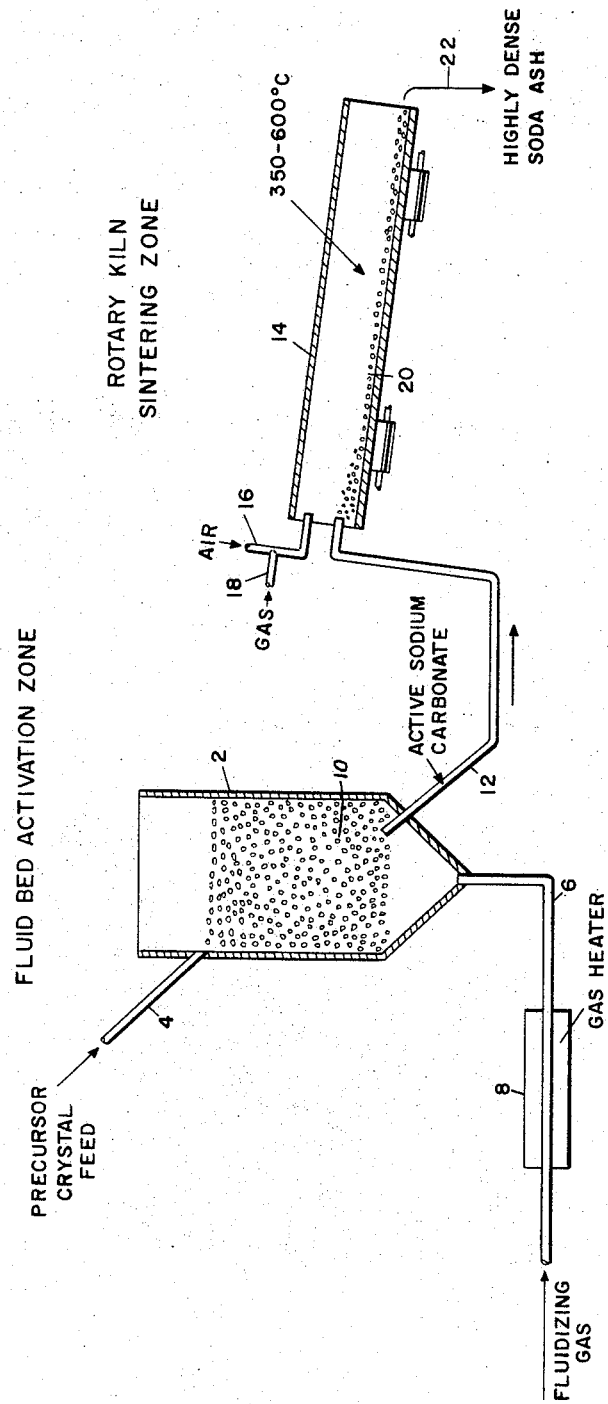
FIG. 1 is a diagrammatical flow sheet which illustrates means for carrying out the present process.

In the embodiment illustrated in FIG. 1, precursor crystals precipitated from aqueous solutions containing carbonate values and/or bicarbonate values are fed through line 4 into a fluid bed activation zone 2. The fluid bed 10 is sustained by means of a fluidizing gas which is introduced through line 6. The gas is preheated by gas heater 8 in order to supply the thermal requirements of the fluid bed 10. The fluid bed 10 is maintained at the temperature required for activation of the precursor crystals. In the case of sodium sesquicarbonate and sodium carbonate monohydrate, the fluid bed 10 is maintained at 75–130° C. and the conversion is carried out in an atmosphere having low water vapor pressures, preferably below about 350 mm. of mercury. "Active" sodium carbonate is removed from the fluid bed 10 through line 12 and is conveyed to rotary kiln sintering zone 14. The "active" sodium carbonate from line 12 is fed into the mouth of the kiln 14 and is heated by hot gases generated within the kiln. These gases are obtained by burning gas, which is fed through line 18, with air which is fed through line 16, at the mouth of the kiln and introducing the hot gases cocurrently with the feed into the kiln. The "active" sodium carbonate is heated in the kiln in bed 20 to maximum sintering temperatures of from about 350° to 600° C. until the desired densification has taken place. The heated gases that are introduced cocurrently into the kiln are controlled to heat the feed at high heating rates. When these rates are expressed in terms of the time constant, $\tau$, values of $\tau$ below about four minutes are used. Thereafter, the highly dense soda ash, 22, is removed from the base of the kiln as product.

The following examples are given to illustrate the present invention and are not deemed to be limiting thereof.

EXAMPLE 1.—DENSIFICATION AT 400° C.

*Run A—conventional heating rates.*—A laboratory scale rotary calciner was made up by constructing a bottle-shaped sintering chamber out of a thin metal foil having a high heat conductivity. The sintering chamber was then wrapped in alternating layers of glass wool and asbestos, thereby decreasing the heat conductivity of the sintering chamber. A 2 g. sample of "activated" sodium carbonate was placed in the sintering chamber and a piece of glass tubing was inserted into the neck of the bottle-shaped sintering chamber. A thermocouple was inserted through the glass tubing into the sintering chamber. The sintering chamber and glass tubing assembly were supported in a horizontal position and a pulley was placed on the free end of the glass tubing. The pulley was attached to a motor driven belt in order to rotate the tubing and the attached sintering chamber. The sintering chamber and a portion of the attached tubing were then inserted in a preheated, thermostatically controlled Lindberg tube furnace and the chamber was rotated at 60 r.p.m. by means of the glass tubing which extended beyond the furnace to the motor driven belt.

The "active" sodium carbonate sample was obtained by heat treating sodium sesquicarbonate monoclinic crystals, produced by the method set forth in U.S. Patent 2,954,282, issued to W. C. Bauer et al. on Sept. 27, 1960, in a calcining step at a temperature of 80° C. and in an atmosphere having a water vapor pressure below 10 mm. of mercury until all the sesquicarbonate was converted to "active" sodium carbonate.

The temperature profile of the sample within the sintering chamber, with increasing time, was followed by a recorder until the desired sintering temperature of about 400° C. was reached. The thermostatically controlled furnace thereafter maintained the sample at 400° C., and the charge was permitted to remain at this temperature for about 30 minutes. Thereafter, the sintering chamber was removed from the furnace, disconnected from the glass tube support, and the contents spilled onto a metal plate to effect rapid cooling. The particle density of the sample was determined using a mercury-filled picnometer. The temperature profile of the samples with increased time, is given below in Table I.

Table I

| Time (min.): | Temperature (°C.) |
|---|---|
|  | 20 |
| 1 | 50 |
| 3 | 100 |
| 4 | 150 |
| 6 | 200 |
| 8 | 250 |
| 11 | 300 |
| 17 | 350 |
| 22 | 375 |
| 25 | 383 |
| 30 | 390 |
| 35 | 400 |
| 67 | 400 |

Based on the results of Table I the time constant, $\tau$, was found to be eight minutes. The density of the finally sintered product was found to be 1.97 g./cc.

In the above experiment the rate at which the sample was heated in the sintering chamber was a function of the heat conductivity of the sintering chamber. In order to increase the heat conductivity of the sintering chamber and to decrease the time constant, $\tau$, a few of the layers of glass wool and asbestos which were wrapped around the sintering chamber were removed and a second experiment, Run B, was conducted in an identical manner.

*Run B—Rapid heating rate of this invention.*—This run was conducted in the same manner as Run A using an identical sample of activated sodium carbonate except that the sintering chamber was wrapped in fewer layers of glass wool and asbestos. The thermostatically controlled furnace maintained the sample at 400° C. and it was permitted to remain at this temperature for about 20 minutes. The temperature profile of the sample is given below.

Table II

| Time (min.): | Temperature (° C.) |
|---|---|
|  | 20 |
| 1 | 50 |
| 2 | 100 |
| 2.5 | 150 |
| 3 | 200 |
| 3.5 | 250 |
| 4 | 300 |
| 5 | 325 |
| 7.5 | 375 |
| 12 | 400 |
| 32 | 400 |

The final density of the sintered sodium carbonate was found to be 2.01. The time constant, $\tau$, was calculated to be 3.4 minutes.

*Run C—more rapid heating rate of this invention.*—A third run was made using the same procedure as Runs A and B with an identical sample of activated sodium carbonate except that more layers of glass wool and asbestos were removed from around the sintering chamber to permit even greater heat conductivity. The thermostatically controlled furnace was again set at 400° C. and the charge was allowed to remain at this temperature for about 25 minutes. The temperature profile of the sample is given below in Table III.

Table III

| Time (min.): | Temperature (° C.) |
|---|---|
|  | 20 |
| 1 | 50 |
| 2 | 100 |
| 2.5 | 200 |
| 3 | 270 |
| 5 | 350 |
| 6 | 375 |
| 9 | 400 |
| 35 | 400 |

The particle density was found to be 2.18. The time constant, $\tau$, was determined as being 2.5 minutes.

*Run D—still more rapid heating rate of this invention.*—Run C was repeated using an identical sample of activated sodium carbonate except that all layers of glass wool and asbestos were removed from around the sintering chamber to obtain maxium heat transfer and to reduce further the value of the time constant, $\tau$. The maximum temperature of the thermostatically controlled furnace was set at 400° C. and the charge was allowed to remain at this temperature for 20 minutes. Density of the final product was found to be 2.28 and the time constant, $\tau$, was found to be ½ minute.

The results of this example have been plotted in FIG. 2 in order to illustrate graphically the change in particle density in the final soda ash with changes in the heating rate expressed in terms of the time constant, $\tau$. In FIG. 2 the horizontal axis defines the time constant, $\tau$, which reflects the rate at which the sample is heated in the sintering chamber. The particle density of the final soda ash obtained from sintering the precursor active sodium carbonate is defined by the vertical axis. As will be observed, the density of the finally sintered product increases as the time constant decreases. Decreases in time constant indicate faster heating rates. It should be noted that even though the sample in Run A was sintered at 400° C. for 30 minutes, which is somewhat longer than the sintering time of the other samples at 400° C., the density of the sintered product of Run A is lower because the heating rate, i.e. time constant, $\tau$, of 8 minutes is above the maximum desired $\tau$ value of four minutes.

EXAMPLE 2—DENSIFICATION AT 400° C.

The procedure of Example 1 was repeated using the same equipment. The maximum sintering temperature employed was 400° C. However, in this experiment the active sodium carbonate sample had a higher activity level than the sample of Example 1. This sample was produced by calcining monoclinic crystals of sodium sesquicarbonate produced by the method set forth in U.S. Patent 2,954,282 at a temperature of 76° C. and in an atmosphere having water vapor pressures of less than 10 mm. of mercury until all the sesquicarbonate was converted to "active" sodium carbonate. Under these calcining conditions a more active sodium carbonate is obtained than that produced under the calcining conditions set forth in Example 1. The rate of heating of the sample expressed as the time constant, $\tau$, and the density of the sintered product are graphically illustrated in FIG. 2.

As will be observed in FIG. 2, higher particle densities are obtained at lower values of $\tau$ (higher heating rates).

EXAMPLE 3—DENSIFICATION AT 400° C.

The process of Example 1 was repeated using the same equipment. The maximum sintering temperature employed was 400° C. However, in this experiment the active sodium carbonate sample had a lower activity level than the sample of Example 1. This sample was produced by calcining monoclinic crystals of sodium sesquicarbonate produced by the method set forth in U.S. Patent 2,954,282 at temperatures of 133° C. and in an atmosphere containing water vapor pressure below 10 mm. of mercury until all the sesquircarbonate was converted to "active" sodium carbonate. Under these calcining conditions a less active sodium carbonate is obtained than that produced under the calcining conditions set forth in Example 1. The rate of heating of the sample expressed as the time constant, $\tau$, and the density of the sintered product are graphically illustrated in FIG. 2.

As will be observed in FIG. 2, higher particle densities are obtained at lower values of $\tau$ (higher heating rates).

EXAMPLE 4.—DENSIFICATION AT 400° C.

The process of Example 1 was repeated using the same equipment and the same testing technique, using 400° C. as the maximum sintering temperature. However, in this example the active sodium carbonate was derived from sodium carbonate monohydrate produced by precipitating crystals of sodium carbonate monohydrate from a saturated aqueous solution of purified sodium carbonate. The monohydrate crystals were calcined at a temperature of 90° C. and in an atmosphere containing water vapor pressures below 10 mm. of mercury to obtain the active sodium carbonate sample used in this experiment. The rate of heating of the sample expressed as the time constant, $\tau$ (higher heating rates).

EXAMPLE 5.—DENSIFICATION AT 450° C.

The process of Example 1 was repeated using the same equipment and the same testing technique except that 450° C. was used as the upper sintering temperature, and the sample was sintered for a total of 30 minutes. The mildly active sodium carbonate sample was obtained by heat treating sodium sesquicarbonate monoclinic crystals produced by the method set forth in U.S. Patent 2,954,282, issued to W. C. Bauer et al. on Sept. 27, 1960, in a calcining step at a temperature ranging between 90° to 140° C. and in an atmosphere having a water vapor pressure of about 500 mm. of mercury until all the sesquicarbonate was converted to an "active" sodium carbonate. Under these calcining conditions a less "active" sodium carbonate is obtained than the samples used in the preceding examples.

The temperature profile of the sample was followed until the desired sintering temperature of about 450° C. was reached. The rate of heating expressed as the time constant, $\tau$, was 0.5 minute, and the density of the sample increased from 1.47 g./cc. to 1.88 g./cc.

As set forth in the prceding examples and as illustrated in FIG. 2, the increased densities obtained by the present sintering technique are also obtained with samples having varied degrees of activity and derived from different precursor crystals. While the present examples have been carried out with an active sodium carbonate obtained under specific calcining conditions from either sodium sesquicarbonate monohydrate, it is considered within the scope of this invention to employ this improved sintering technique with any active sodium carbonate regardless of the precursor crystal from which it is derived and regardless of the degree of activity which this active sodium carbonate possesses.

Pursuant to the requirements of the patent statutes, the principle of this invention has been explained and exemplified in a manner so that it can be readily practiced by those skilled in the art, such exemplification including what is considered to represent the beset embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing dense soda ash, wherein precursor crystals which are capable of being calcined to soda ash are heated in an atmosphere having reduced ambient water vapor pressures until said crystals have been converted to an active sodium carbonate having small crystallites and predominantly small pores, and wherein said active sodium carbonate is heated in a second heating step to temperatures above about 300° C. until it has densified into a more imporous, coherent form, the improvement which comprises carrying out said second heating step at temperatures of from about 350° C. to about 600° C. and at a heating rate that is rapid during the initial portion of the heating step, said heating rate being sufficient to yield a time constant, $\tau$, of less than four minutes when the heating step is expressed by the formula:

$$T_f - T_\theta = (T_f - T_0)e^{-\theta/\tau}$$

wherein:
$T_f$ = final temperature
$T_0$ = initial temperature
$T_\theta$ = temperature at the end of any period of time $\theta$
$\theta$ = the elapsed time (in min.) since the beginning of the heating period
$\tau$ = time constant (in min.).

2. Process of claim 1 in which the precursor crystals are sodium sesquicarbonate.

3. Process of claim 1 in which the precursor crystals are sodium carbonate monohydrate.

4. In the process of producing dense soda ash, wherein precursor crystals which are capable of being calcined to soda ash are heated in an atmosphere having reduced ambient water vapor pressures until said crystals have been converted to an active sodium carbonate having small crystallites and predominantly small pores, and wherein said active sodium carbonate is heated in a second heating step to temperatures above about 300° C. until it has densified into a more imporous, coherent form, the improvement which comprises carrying out said second heating step at temperatures of from about 350° C. to about 600° C. and at a heating rate that is rapid during the initial portion of the heating step, said heating rate being sufficient to heat said active sodium carbonate through at least about 95% of the total heating range encompassed by said second heating step within about twelve minutes.

5. Process of claim 4 in which the precursor crystals are sodium sesquicarbonate.

6. Process of claim 4 in which the precursor crystals are sodium carbonate monohydrate.

References Cited

UNITED STATES PATENTS

| | | | |
|---|---|---|---|
| 1,907,987 | 5/1933 | Lynn | 23—63 |
| 2,161,711 | 6/1939 | Keep et al. | 23—63 |
| 2,954,282 | 9/1960 | Bauer et al. | 23—63 X |
| 2,962,348 | 11/1960 | Seglin et al. | 23—63 X |
| 3,028,215 | 4/1962 | Frint | 23—63 |
| 3,104,492 | 9/1963 | Handwerk et al. | 23—63 |
| 3,189,408 | 6/1965 | Miller | 23—63 |

OSCAR R. VERTIZ, *Primary Examiner.*

G. T. OZAKI, *Assistant Examiner.*

UNITED STATES PATENT OFFICE
CERTIFICATE OF CORRECTION

Patent No. 3,336,105                August 15, 1967

William F. Beck et al.

It is hereby certified that error appears in the above numbered patent requiring correction and that the said Letters Patent should read as corrected below.

Column 1, line 39, after "soda" insert -- ash --; line 44, for "Di Bella" read -- Di Bello --; column 2, line 27, for "temperatures" read -- temperature --; column 3, line 7, for "15°" read -- 115° C. --; line 17, for "($CO_2$" read -- ($CO_2$) --; column 7, line 34, for "pressure" read -- pressures --; line 58, after "$\tau$" insert and the density of the sintered product
     are graphically illustrated in FIG. 2.
         As will be observed in FIG. 2 higher
     particle densities are obtained at lower
     values of $\tau$ column 8, line 13, after "carbonate" insert -- or sodium carbonate --.

Signed and sealed this 26th day of November 1968.

(SEAL)
Attest:

EDWARD M. FLETCHER, JR.            EDWARD J. BRENNER
Attesting Officer                  Commissioner of Patents